US005597350A

United States Patent [19]
Hunking et al.

[11] Patent Number: 5,597,350
[45] Date of Patent: Jan. 28, 1997

[54] FLEXIBLE PROBE FOR DECROPPING POULTRY CARCASSES

[75] Inventors: Maurice J. Hunking; Gerald F. Banks, both of Lehigh Acres; Todd E. Walter, Fort Myers, all of Fla.

[73] Assignee: Baader North America Corporation, Fort Myers, Fla.

[21] Appl. No.: 552,948

[22] Filed: Nov. 3, 1995

[51] Int. Cl.$^6$ ............................................. A22C 21/06
[52] U.S. Cl. ..................................... 452/117; 452/119
[58] Field of Search ................................ 452/117, 118, 452/119

[56] References Cited

U.S. PATENT DOCUMENTS

| | | | |
|---|---|---|---|
| 2,512,290 | 6/1950 | Spang | 452/117 |
| 2,914,794 | 12/1959 | Barker et al. | 452/93 |
| 3,537,128 | 11/1970 | Zebartn et al. | 452/93 |
| 4,610,050 | 9/1986 | Tiereman et al. | 452/117 |
| 4,788,749 | 12/1988 | Hagenbroek et al. | 452/119 |
| 4,958,408 | 9/1990 | Meyn | 452/117 |
| 5,122,090 | 6/1992 | Van de Nieuwecarr et al. | 452/117 |
| 5,178,578 | 1/1993 | Simmons | 452/117 |
| 5,222,905 | 6/1993 | Van den Nieuwecarr et al. | 452/117 |

FOREIGN PATENT DOCUMENTS 539051   4/1957   Canada ............................ 452/88

Primary Examiner—Willis Little
Attorney, Agent, or Firm—Morrison Law Firm

[57] ABSTRACT

A flexibly structured probe carrying flexible fingers arrayed on the probe is used in decropping apparatus to snag and pull away from a poultry carcass membrane, crop, trachea and esophagus inedibles, the probe passing through the carcass stomach cavity and the neck passage in effecting this removal. The probe can be made of a resilient material such as a urethane this composition giving sufficient flexibility that the probe can deflect when encountering carcass inside obstructions to avoid damaging the carcass, and also the flexible fingers bending to prevent same breaking bones in the carcass when the rotating probe encounters such bones.

23 Claims, 10 Drawing Sheets

FLEXIBLE PROBE FOR DECROPPING POULTRY CARCASSES

BACKGROUND OF THE INVENTION

The present invention relates to removal of the crop and other inedibles from a poultry carcass and, more particularly, to a flexible finger carrying flexibly structured rotary probe which functions to that end without either the probe or fingers during the pull away removal of these inedibles causing any significant damage to the carcass.

In the processing of poultry, chickens for example, a bird is beheaded, defeathered and internal organs removed from the stomach cavity. Various means for automated effecting of the foregoing operations are known in the art. Following these, the bird carcass hanging neck down on a conveyor with the carcass breast part facing either toward or away from the processing machine, passes to a decropping operation wherein carcass parts commonly accepted as being inedibles are removed, these parts comprising the crop, trachea, esophagus, and membrane.

Crop removal can be made with a rotary probe which enters the carcass cavity to remove the crop and other viscera parts by grabbing same, the probe being designed to enter and pass down through the neck passage and outwardly of the carcass, the removed crop and other viscera parts then being cleared from the probe before it retracts upwardly through the carcass for a new decropping operation. Representative of known such foregoing devices are those described in U.S. Pat. Nos. 4,610,050 and 4,788,749.

The rotary probes described in these patents as well as others used in the industry are rigid, for example, metal components. Further the probes have rigid teeth, commonly placed at opposite diametrical locations on the probe. If the hanging carcass is only slightly misaligned in respect of the operating travel path of the rotary probe (which moves longitudinally in tandem with the conveyor), the probe in travelling a fixed course through the carcass may not find the portal to the neck passage —it is rigid and cannot deflect if such could remedy the misalignment— and thus properly register with it so that the instead of passing through the neck passage, the probe is driven through the side of the carcass. The resulting damage can require reworking of the carcass and additionally, some loss of yield is to be expected.

Another disadvantage of known rotary probes is the potential for causing carcass damage with the rigid teeth of the probe. The teeth are used to grab the membrane, crop etc to be removed. In doing this as well as passing through the carcass generally, these rigid elements can strike and break carcass ribs, shoulder bones, pulley bones. Tooth action also can chew up the neck bone. All this represents problems in further carcass processing.

OBJECTS AND SUMMARY OF THE INVENTION

Accordingly, it is an object of the invention to provide a probe for use in poultry decropping apparatus which overcomes the drawbacks of the prior art.

It is a further object of the invention to provide a probe for poultry decropping apparatus which allows such accomplishment while producing fewer broken carcass bones and other incidents of carcass damage.

It is a still further object of the invention to provide a probe for poultry decropping, the employment of which results in less carcass rework, higher meat yield and a safer final product.

Another object is to provide a probe for poultry decropping which removes a higher percentage of membrane, crop, trachea and esophagus inedibles from a poultry carcass than possible with known probe constructions.

A still further object is to provide a probe for poultry carcass decropping which is flexibly structured to minimize its potential to cause carcass damage yet is highly effective to the end of snagging and removing and pulling away inedibles from the carcass.

Another object is to provide a probe for poultry carcass decropping which is easier to clean than prior probes and therefore lessens processing contamination.

Briefly stated, there is provided a flexibly structured probe carrying flexible fingers arrayed on the probe. The probe is used in decropping apparatus to snag and pull away from a poultry carcass membrane, crop, trachea and esophagus inedibles, the probe passing through the carcass stomach cavity and the neck passage in effecting this removal. The probe can be made of a resilient material such as a urethane this composition giving sufficient flexibility that the probe can deflect when encountering carcass inside obstructions to avoid damaging the carcass, and also the flexible fingers bending to prevent same breaking bones in the carcass when the rotating probe encounters such bones.

In accordance with these and other objects of the invention, there is provided a probe for use in poultry decropping apparatus, the apparatus operating to pass the probe into a poultry carcass cavity and through a carcass neck passage so that the probe in a travel thereof and while the probe is being rotated, can snag and effect carcass membrane, crop, trachea and esophagus inedibles pull away removal from the neck passage and carcass cavity environs proximal said neck passage. The probe comprises a probe body, and fingers carried on and extending outwardly from the probe body. The probe body is elongated and flexibly structured so that the probe body can along at least an appreciable fore length part thereof will when in its travel it contactingly engages a carcass obstruction encroaching such travel, deflect from said travel enough to prevent the probe from damaging and/or puncturing the carcass. The fingers are sufficiently flexible to bend on engagement with carcass bone structure from a normally unbent condition thereof to a deflected condition thereby to inhibit possibility of breaking of such bone structure with said fingers, said fingers being effective when contacting said inedibles to snag and effect pull away removal of said inedibles from the carcass.

According to feature of the invention, there is further provided an apparatus for removing membrane, crop, trachea and esophagus inedibles from a body cavity and neck passage of a poultry carcass while the poultry carcass is hung by its legs from a moving conveyor so that a vent opening to the body cavity faces upwardly and the carcass neck extends downwardly from the body cavity. The apparatus includes a removal unit movable in tandem with the conveyor. This removal unit has a probe and stroking means connected with the probe and operable to stroke the probe up and down along a fixed course. This stroking means also is operable to rotate the probe. The probe is operable during the course of being stroked down along said fixed course and while rotating to enter the body cavity and pass adjacent and snag the membranes, crop, trachea and esophagus and pull away remove them from the carcass. The probe in a terminal portion of its downward movement passes through the neck passage while carrying along the removed inedibles to a carcass cleared position so that in said position, the inedibles can be cleaned from the probe. The probe comprises an elongated probe body carrying a plurality of flexible fingers extending outwardly of a probe body outer surface. The probe body is flexibly structured so that at least a fore length part thereof, will when contactingly engaging a carcass obstruction encroaching the probe fixed course deflect from the fixed course enough to prevent the probe body damaging and/or puncturing the carcass. The flexible fingers bend flexibly upon engagement of said fingers with carcass bone structure from a normally unbent condition thereof to a deflected condition thereby to inhibit possibility of breaking of such bone structure with said fingers, said fingers being effective when contacting said inedibles to snag and effect pull away removal of said inedibles from the carcass.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
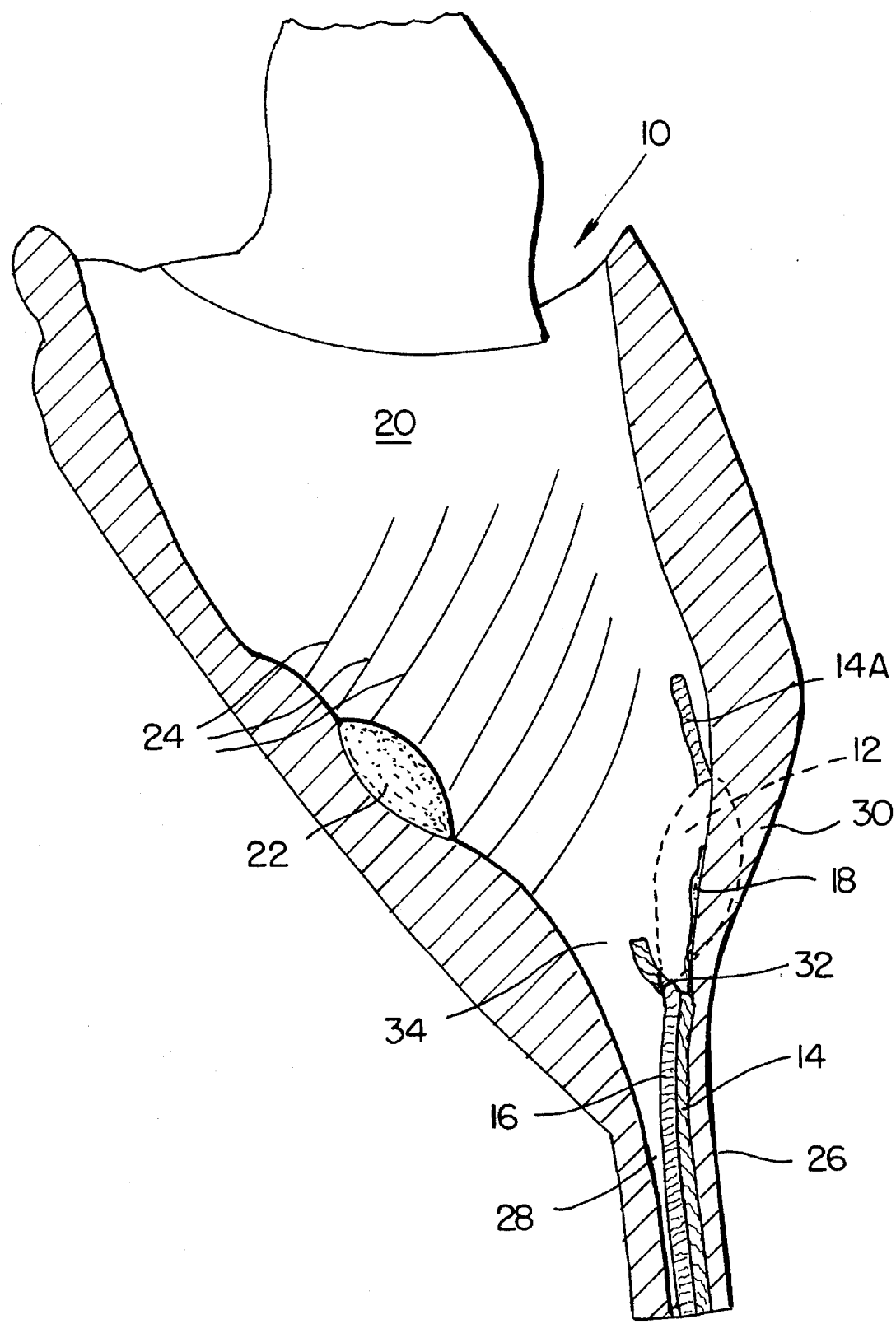
FIG. 1 is a vertical central section of a poultry carcass depicting the location in the carcass of the crop and certain other inedibles that are to be removed in a decropping operation.

Reference is made to FIG. 1 in respect of a the here given short description of what a poultry carcass decropping operation involves. It will be understood that a carcass 10 (only a half section thereof being shown in FIG. 1) arrives at the decropping operation headless, defeathered and with the stomach cavity cleaned of certain poultry parts, the carcass breast facing the machine side in the depiction but it being understood that the back of the carcass could face the machine without effect on the use of the probe of the invention. There remains to be removed in decropping, certain inedible carcass parts which comprise the crop 12, the esophagus 14, trachea 16 and numerous areas of membrane 18, the membrane, for example, lining parts of cavity 20 as well as being entwined with and overlaying the other inedibles. Depicted also in FIG. 1 are a lung 22, carcass ribs 24 and the carcass neck 26 having passage 28 wherein both the trachea and esophagus extend.

The crop 12 is depicted in dashed line to reflect that the crop lies behind the plane of the view to one side on the carcass intermediate meat 30 of carcass 10 and the skin, the crop being close to the shoulder and being attached to the esophagus as at 32. In the decropping, a decropping tool carrying a rotary probe is inserted in cavity 20 so that during its travel downwardly toward the neck passage 28 it will snag trachea part 14A first to therewith start a pull around on the crop 12 to bring it into the cavity and move it toward the portal 34 of the neck passage 28.

As the probe arrives at the portal 34 it is carrying the trachea 14 part 14A and it may also at that point have started a snagging of the membrane 18 so that in this location a good grip of inedibles by the probe is first realized.

As the probe passes through the neck passage pull away of the trachea 14, membrane and the esophagus continues so that eventually, the neck passage is free of the foregoing. Once outside of the carcass and below the neck, the rotary probe will be cleaned of the removed inedibles thereon with, for example, a counter rotating brush following which the tool will be oppositely rotated and raised back up through the decropped carcass for a next operating cycle.

Proper entry of the rotary probe into the portal region 34 of the neck passage without having encountered obstruction within the cavity requires there be an intended alignment of the carcass with respect to the fixed travel of the probe. In many instances, carcass misalignment will exist so that the probe travel will result in encounter thereof with a carcass part distal the portal. With known rigid probe constructions, coupled with the fact of the probe rotating, there can result unwanted damage to the carcass such as puncture of the carcass. Further, the rigid teeth on the probe can strike carcass bone and break same. Both happenings are disadvantageous in that carcass rework must be carried out later. Additionally, meat yield loss can take place and this is a meaningful economic loss.

Figure 6:
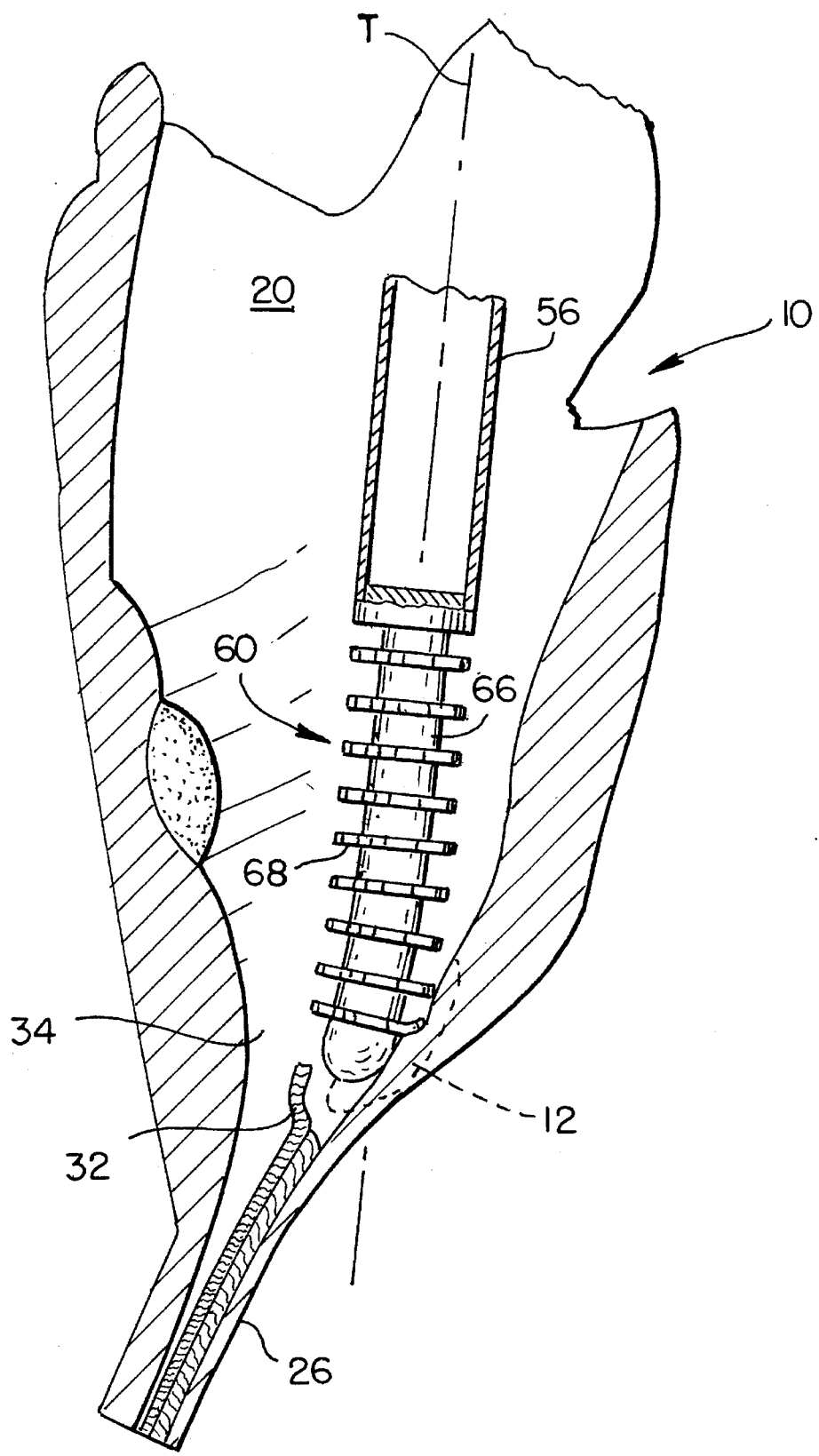
FIG. 6 is a vertical sectional illustration showing of a poultry half carcass and illustrates a deflection of the flexible probe which has encountered the carcass breast, the obstruction arising because the suspended carcass is not properly aligned so as to allow the probe to access the poultry neck passage portal in its travel course in manner clear of obstruction.

FIG. 6 depicts a carcass—probe misalignment condition, i.e., where probe travel axis T is such offset relative to portal 34 that a prior art probe almost certainly will cause damage incident its decropping function. While the depiction is of the probe of the invention where flexibility of the probe will allow it to deflect enough to prevent carcass damage, the visual picture of what could take place with the misalignment where a rigid probe is involved is amply portrayed. Misalignment is shown as to one where the axis T intersects the breast side of the carcass. It is equally possible that misalignment could occur at the other side of the carcass, i.e., the carcass back side.

Figure 2:
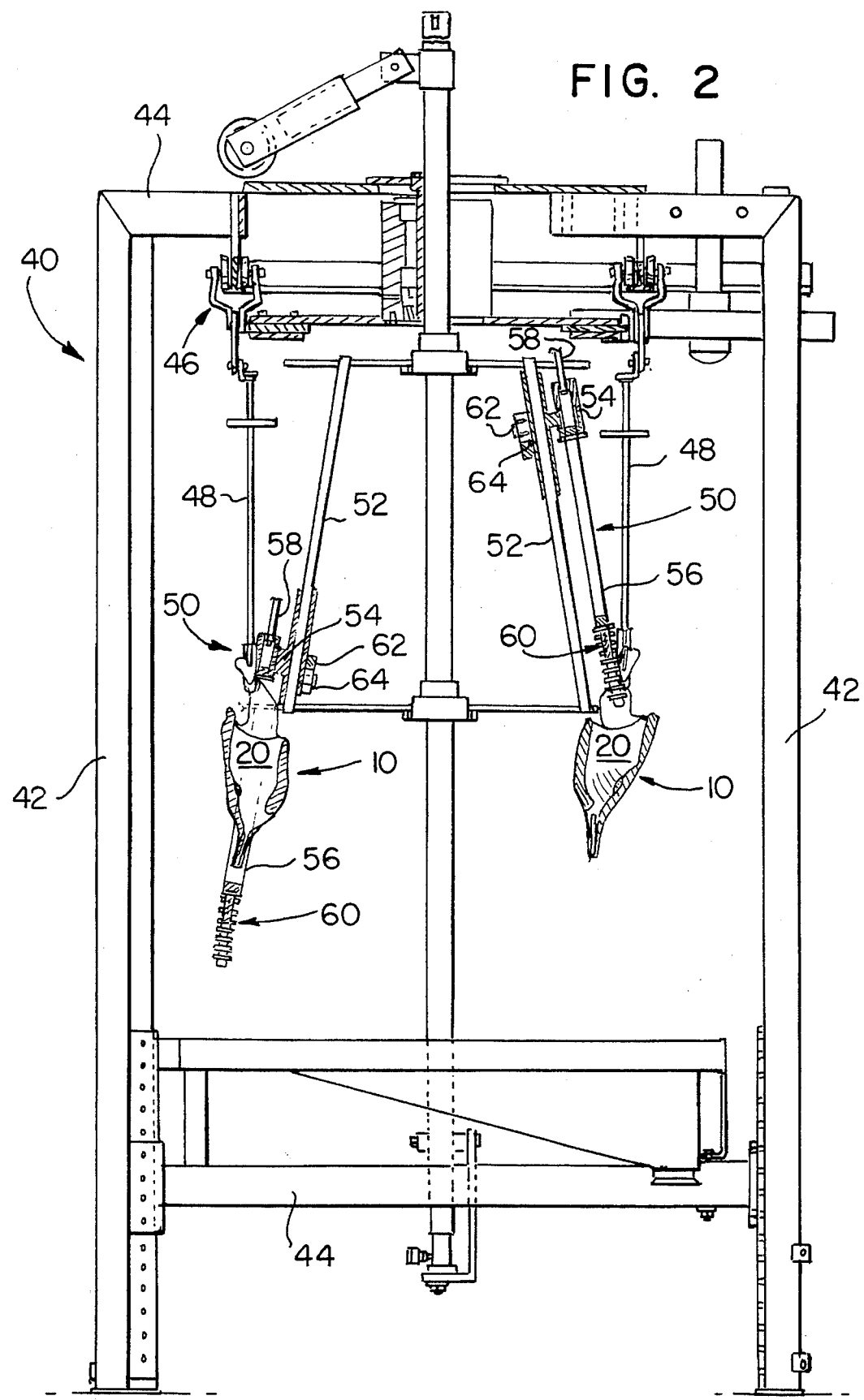
FIG. 2 is an elevational view with parts in section of apparatus with which decropping of a poultry carcass can be carried out, the apparatus being fitted with the flexible probe of the invention.
Figure 2A:
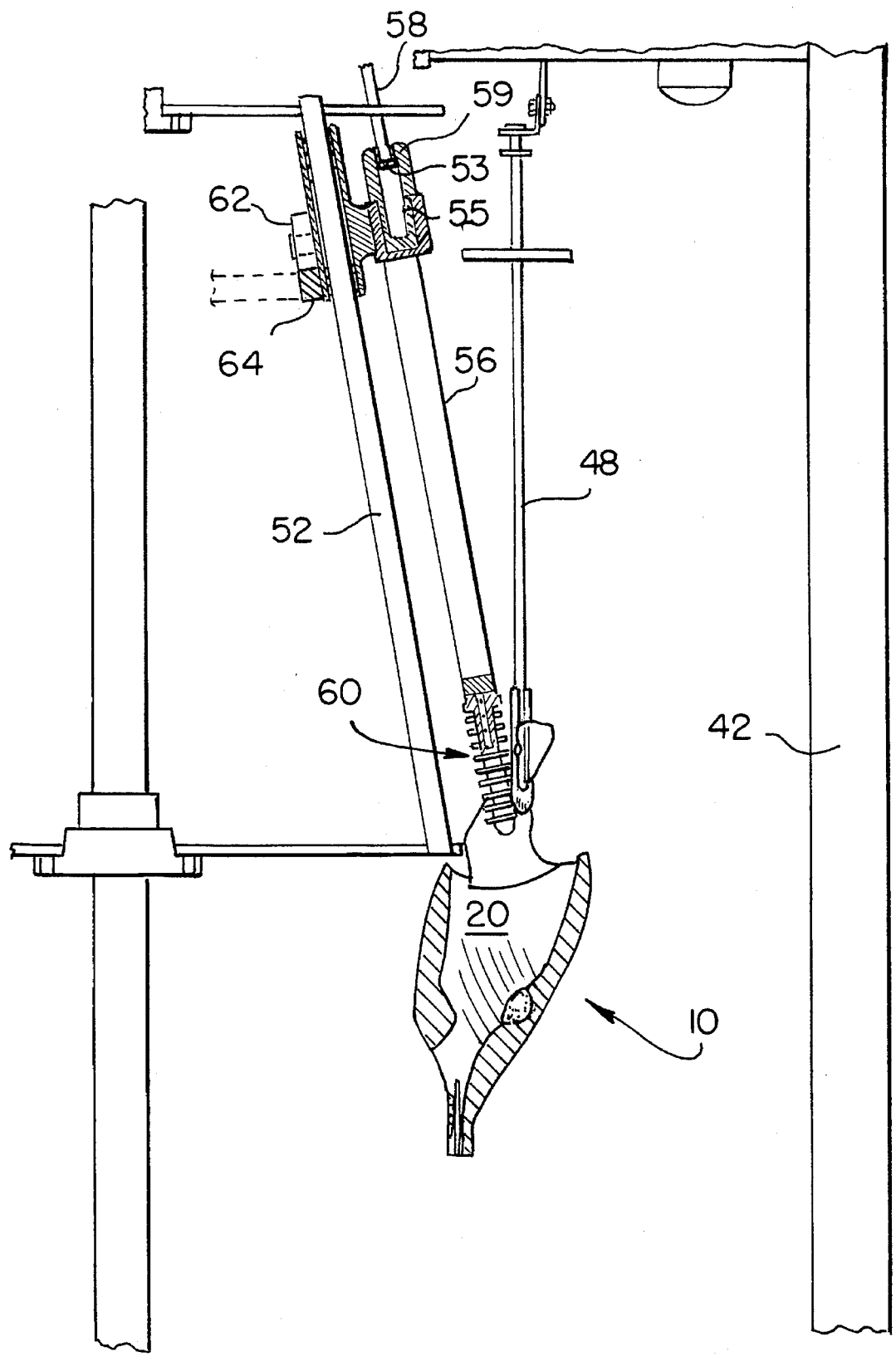
FIG. 2A is a fragmentary elevational view on enlarged scale of a decropping unit portion of the apparatus showing details of the cropping unit mounting and means by which rotation and sliding of the probe is effected.

Referring now to FIGS. 2 and 2A, there is shown a decropping station portion of poultry carcass apparatus 40. This apparatus is, except for the probe of the invention embodied therein, of generally known construction, the apparatus described in the two earlier noted U.S. patents being exemplary.

Apparatus 40 includes upright and crosswise support framing 42, 44, respectively, which carries moving components such as a conveyor 46 having shackles with hangars 48 from which hang suspended carcasses 10, the carcasses passing seriatim through the decropping station. Each carcass 10 hangs by the legs with its breast facing inwardly toward the machine although carcass facing could be reversed so that the carcass back faces the machine. Decropping can proceed without any effect thereon due to the particular carcass facing orientation used.

Associated with each carcass 10 is a decropping or inedibles removal unit shown generally at 50, the decropping units travelling in tandem with the shackles.

The shackle/decropping unit travel is such that during the decropping operation, the carcass 10 at the right of FIG. 2 approaches the viewer and makes a turnaround 180 degrees to the left so as to depart from the viewer, decropping occurring during this approaching and departing travel.

Each decropping unit 50 includes a guide bar 52 on which is carried a transmission component 54 with which rotary and sliding movement is transmitted to a tubular rod 56 at a tip end of which is fixed a flexible probe 60 as provided by the invention. The transmission component 54 is mounted to slide along guide bar 52 being captive thereon.

Component 54 also mounts a bearing 55 for rotary support of an element thereof which receives rotary drive of a, e.g., square drive rod 58 driven from above by means and manner known as, for example, drive like described in the two earlier mentioned U.S. patents, rod 58 being received in a square opening 53 in a cap 59 of the bearing so that rotation of rod 58 produces rotation of tubular rod 56 and in turn, the probe 60.

Each transmission component 54 also carries a cam follower roller 62 which rides on a fixed cam 64 laid out in manner akin that depicted in U.S. Pat. No. 4,610,050 so that as each decropping unit travels around the decropping station, the component and hence, the probe 60 associated therewith is slid upwardly and downwardly in the straight line travel defined by axis T between the decropping unit sliding travel extremes generally depicted at the right and left sides in FIG. 2.

The embodiment of flexible probe 60 shown in FIG. 2 will be described further with reference to FIGS. 3–5. Probe 60 has an elongated probe body 66, preferably of cylindrical configuration and on which is carried a plurality of flexible fingers 68, the flexible fingers 68 being arrayed in longitudinally disposed, circularly spaced groupings of the fingers. The fingers 68 advantageously are made integral with probe body 66 as by molding or likewise forming the probe body and figures from a flexible, resilient material.

Various polymeric based compositions are suitable for making the probe 60. Preferably a selected polymer should be one approved by the USDA for use with dry, aqueous and fatty foods. Particularly suited is a urethane based material made from VIBRATHANE 8007 prepolymer manufactured by Uniroyal Chemical Company,Inc. of Middlebury, Conn. cured with VIBRACURE A 125 extender of the same company or with 1,4 Butanediol or mixtures of these extenders. It is expected that other polymeric bases could be used but such should be USDA approved for the intended use, and preferably the resultant compositions produced have a Shore hardness of about 70 to about 80 durometer on the A scale.

Figure 3:
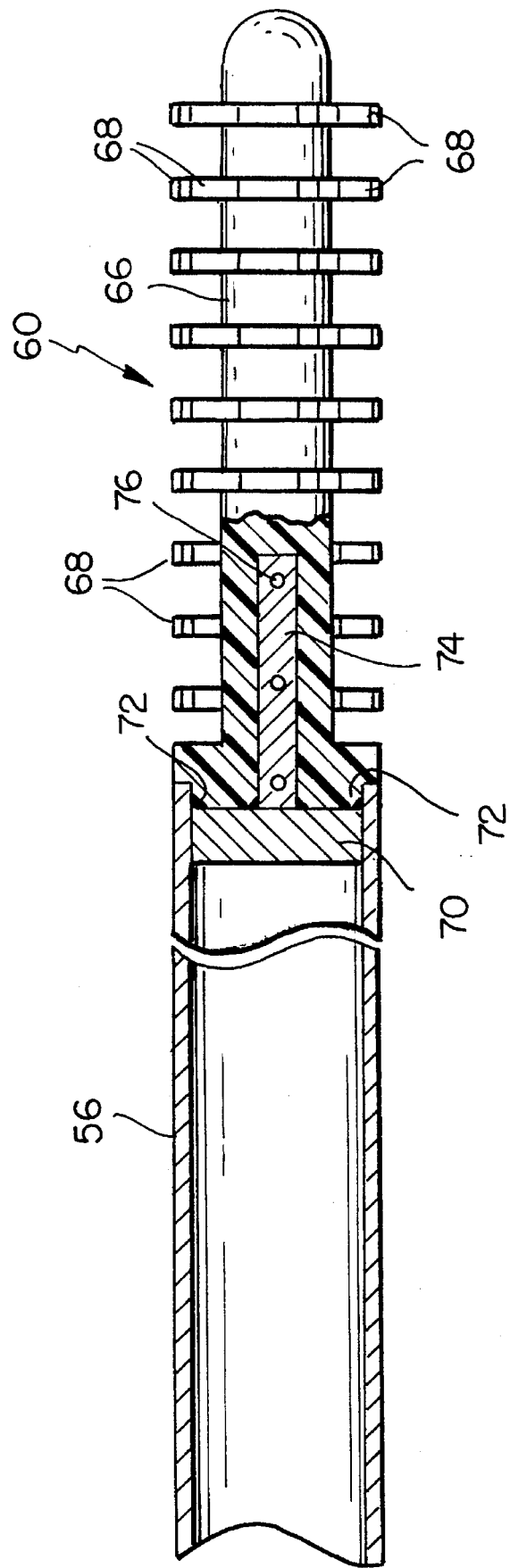
FIG. 3 is a side elevational view, partly in section, of a flexible probe made in accordance with the invention, the probe being fixed to a tubular rod with which sliding up/down and rotary travel is imparted to the probe during the decropping.

As seen in FIG. 3, the probe 60 is connected with a tip end of tubular rod 56. This connection is made by welding or soldering a disc 70 to the tip end of rod 56 as at 72. Additionally, a probe stiffening shank 74 is welded as at 74 to disc 70. The shank 74 has a number of passages 76 therein which are invested by the polymer during curing so that an anchorage of the probe body is provided to insure that same will unitarily rotate with tubular rod 62. It also is possible to provide additional anchoring of the probe body by, for example, using a square section for the shank 74, slotting the shank etc.

Figure 4:
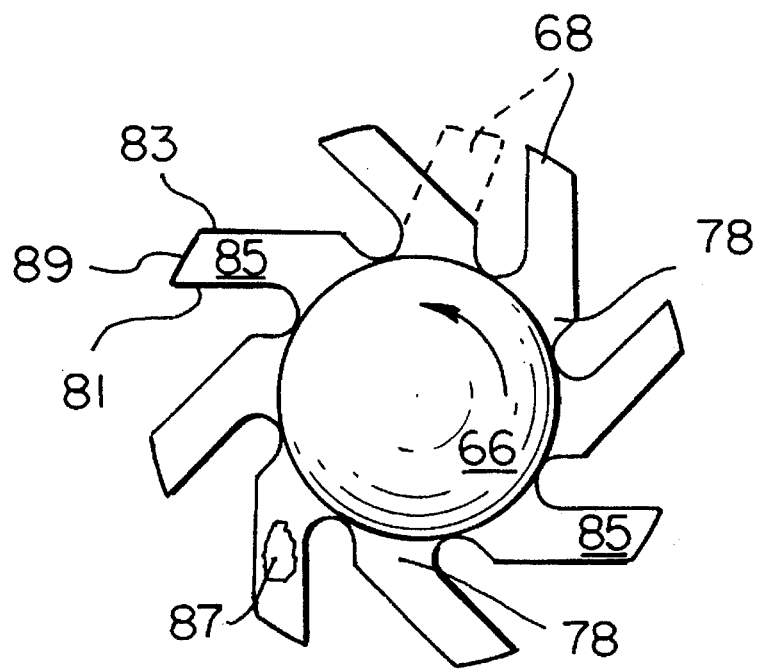
FIG. 4 is an end elevational view of the flexible probe shown in FIG. 3 illustrating the flexible finger array carried on the probe body and further how the flexible fingers can bend on striking a carcass bone or other hard surface so as to prevent inflicting unwanted damage to the carcass.
Figure 5:
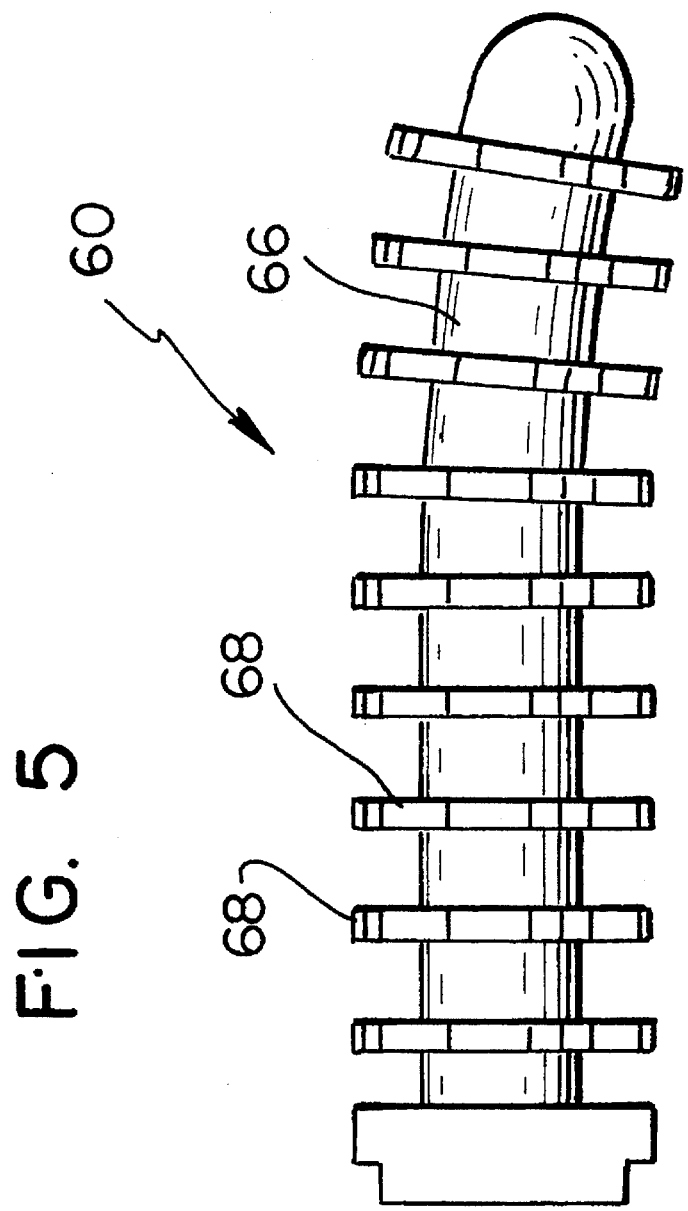
FIG. 5 is a side elevational view of the flexible probe depicted in FIG. 3 showing the manner in which a fore end part thereof can deflect when contacting an obstruction to its normal probe travel course inside a poultry carcass.

FIG. 4 illustrates the configuration of the flexible fingers of the probe 60 embodiment. It is seen that the fingers extend a distance from a root part 78 angled or canted obliquely relative to the external surface of the probe body 66 and have a normally unbent condition. During the decropping, i.e., when the flexible fingers are working to snag the inedibles, the depicted probe is rotated counterclockwise. The probe also could be rotated in a clockwise direction during snagging but in that instance, the flexible fingers would be oriented in an opposite sense on the probe body.

If during travel in the carcass at any location where the fingers strike an obstruction such as a carcass bone which otherwise might be broken, the fingers 68 will flex or bend away from the obstruction to a deflected condition thereby to prevent causing damage. This finger bending is shown in dashed lines. After passing the obstruction, the fingers are free to restore to the full line unbent condition.

Illustrative on the last noted is consideration that when the probe fingers are at the neck passage portal, the carcass pulleybone presents an obstruction to unbent fingers so that on striking that bone, the fingers flex toward the probe body and away from the pulleybone to pass by it without damaging the bone. As the fingers enter a short distance into the softer structure of the neck passage (about ½") they will unbend or extend outwardly of the probe body to present snagging structure in the neck passage effective to snag the inedibles therein.

The flexible and resilient nature of the fingers as well as the Shore Hardness of the composition from which it is made is such as to allow the flexible fingers to flex to pass obstructions yet retain substantial unbent configuration sufficient to engage and snag the inedibles during the decropping downward travel of the probe. On the other hand and after the probe has passed out below the carcass neck and been cleaned, the flexible fingers readily yield in a trailing disposition thereof as the probe passes up through the neck passage in its withdrawal travel from the decropped carcass.

Figure 9:
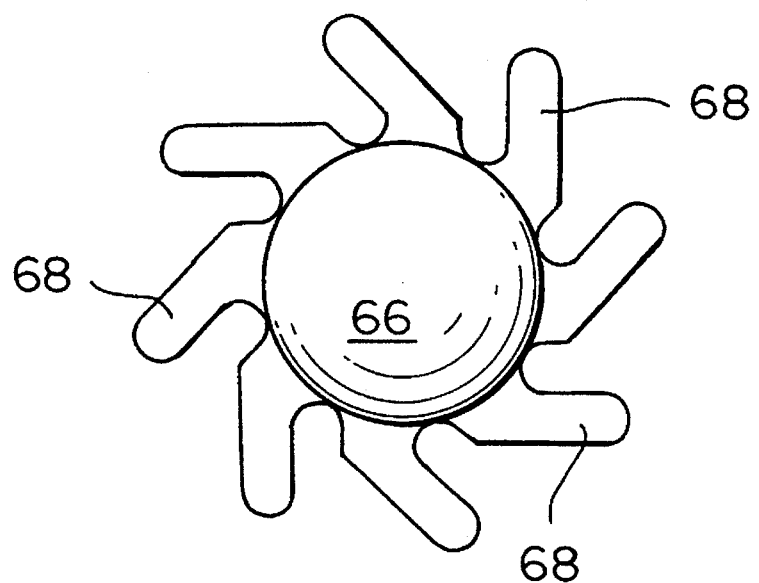
FIG. 9 is an end elevational view of the FIG. 8 probe.

The flexible fingers 68 are shaped such as to present structure calculated to snag inedibles and especially membranes which can be difficult to snag. To aid in snagging, the probe fingers can be of rectangular shape having opposite planar front and rear faces 81, 83 and opposite planar side faces 85, 87, these faces meeting the flat planar top face 89, the top face having slightly rounded ends where such face meets the finger front and rear faces. This finger geometry enhances snagging action of the fingers. FIG. 9 depicts a variation in the geometry of the probe flexible fingers 68 to the extent that the top faces of the fingers are convex rounded surfaces.

Shank 74 as indicated above has a function of stiffening a rear end length part of the probe body so that the probe body cannot be bent back excessively into near loop configuration while in the carcass. A fore length part of probe body 66 is intended though to flex to move the body away from a carcass obstruction without rendering carcass damage. FIG. 5 shows how the probe body 66 can be deflected from straight line body orientation to a flexed or deflected positioning thereof at the fore end to move the probe away from a carcass obstruction.

As can be understood with reference to FIG. 6, the probe 60 will as it approaches the portal 34 to the neck passage 28 deflect if necessary to avoid a carcass obstruction resulting from carcass misalignment relative to the probe travel course. The fingers 68 also will bend or deflect as illustrated by the configuration of the finger nearest the probe fore tip end. However, the fingers 68 will work to snag membrane and pull them toward the neck passage. As the probe flexes on encountering an obstruction and because the probe moves along a fixed path, the carcass will be displaced laterally by the probe movement to reposition the carcass so the portal will lie in the probe fixed travel path. This will facilitate the probe entering the neck passage in proper decropping orientation.

As the probe enters portal 34 and is approaching the neck passage it will be carrying the pulled away tracheas part 14A and crop inedibles. On entering the neck passage, the probe swill be snagging the esophagus as well as membrane.

Figure 7:
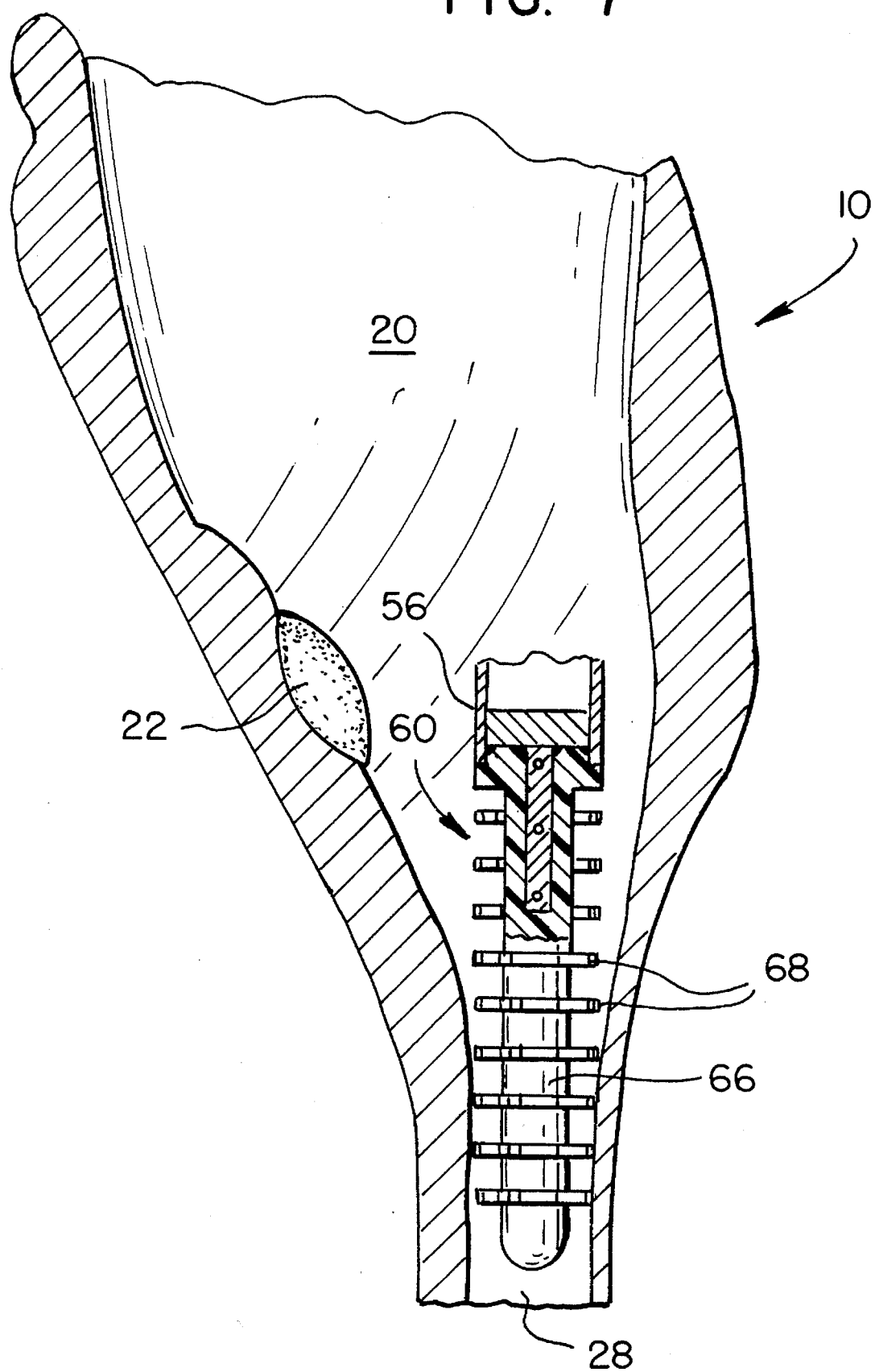
FIG. 7 is a vertical sectional view through a poultry half carcass showing how the flexible probe which has entered the neck passage widens the neck passage incident travel therein for removal of the inedibles.

Entry of the probe tip end into the neck passage from the portal will force spreading enlargement of the neck structure to accommodate the probe pass through. In pass through of the neck passage, the probe positioned as shown in FIG. 7 will snag any membrane therein, will pull away the trachea and esophagus portions in the neck as well as the inedibles pulled away earlier so that as the probe passes out of the neck it will pull along the trailing removed inedibles in addition to those snagged and wrapped around the probe itself.

Figure 8:
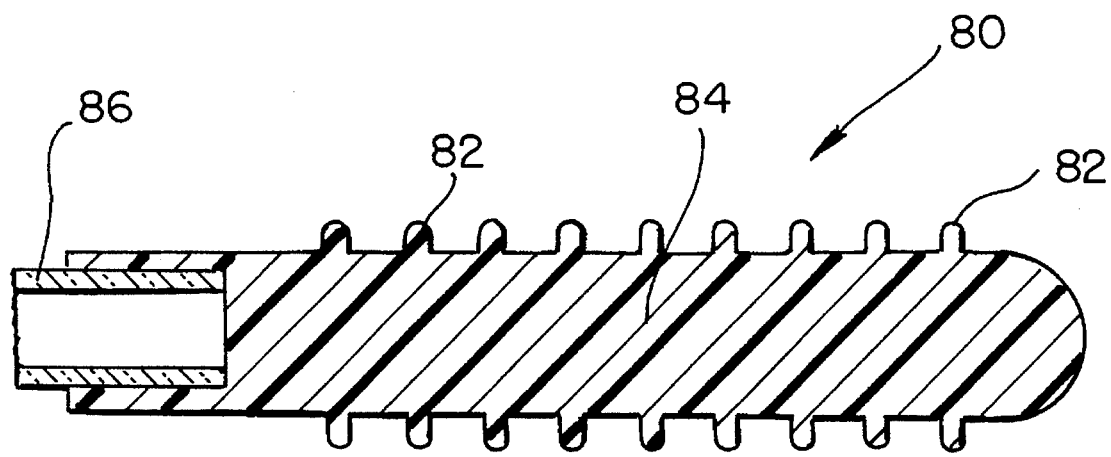
FIG. 8 is a longitudinal sectional view of another probe form having rounded flexible finger tip ends arid a threaded connecting fitting at a rear end of the probe.

FIG. 8 shows another embodiment of probe 80 characterized by provision of flexible fingers 82 which extend radially of the probe body 84, and of embodiment of another means by which the probe can be connected to tubular rod 56. In this instance, the rear end of the probe body is molded around an external/internal threaded fitting 86 which has its outer threads embedded in the urethane mass of the probe body. The internal threads serve as means for mounting the probe to a companion threaded part at the tip end of tubular rod 56.

Figure 10:
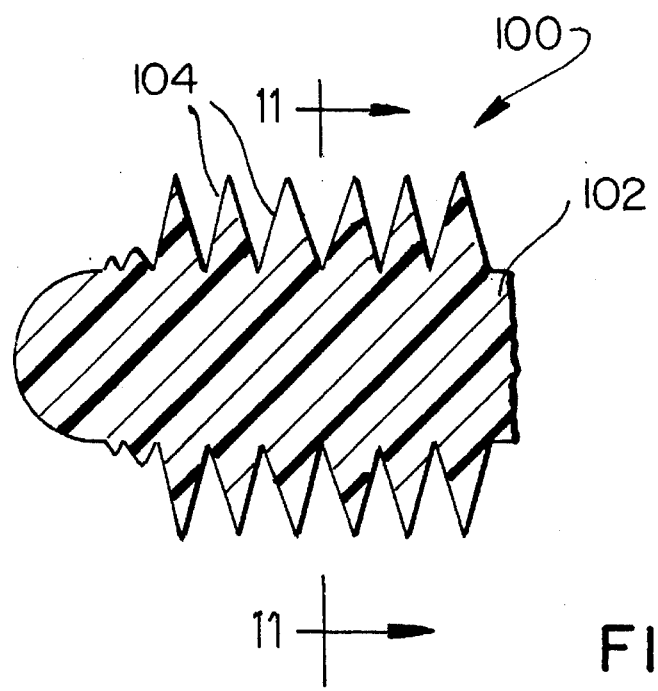
FIG. 10 is a longitudinal central sectional view of a fore length portion of another embodiment of flexible probe.
Figure 11:
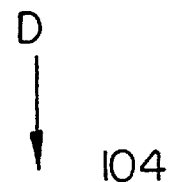
FIG. 11 is a sectional view taken on the line 11—11 in FIG. 10.
Figure 12:
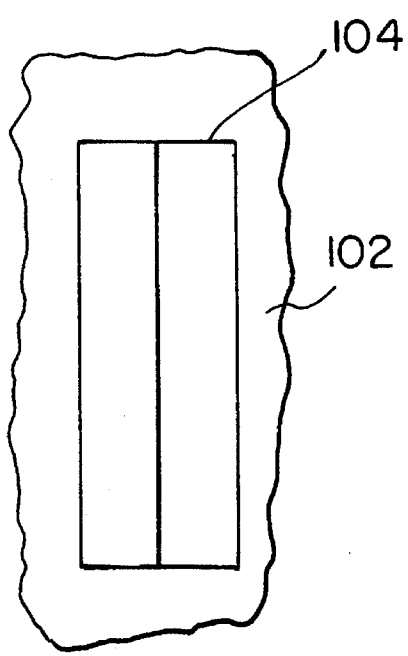
FIG. 12 is a fragmentary plan view on enlarged scale as viewed in the direction of arrow D in FIG. 11 and illustrates the shape of the flexible fingers of the FIG. 10 probe.
Figure 12:
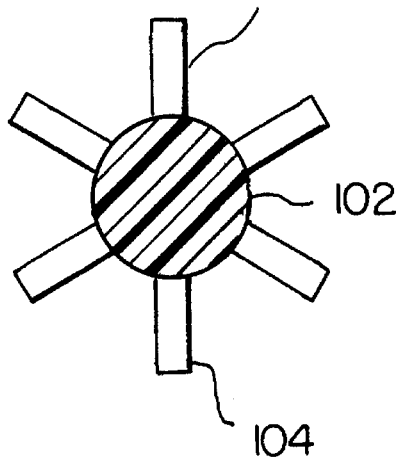

Another embodiment of flexible probe 100 is show in FIGS. 10–12. Probe 100 has a probe body 102 from the outer surface of which extend a plurality of radially directed flexible fingers 104, circularly spaced such fingers being aligned in longitudinal rows of fingers as seen best in FIG. 11. The flexible fingers as seen from FIG. 12 present a triangular section profile.

In respect of the arraying of the flexible fingers on the probe body, it will be understood that there need not be equal numbers of fingers in each longitudinal row nor need the spacing of fingers in any given longitudinal row be uniform. Variations in the foregoing that provide effective snagging and pull away of the inedibles could be used it being essential only that the probe body and flexible fingers having the flexing abilities described heretofore.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A probe for use in poultry decropping apparatus, the apparatus operating to pass the probe into a poultry carcass cavity and through a carcass neck passage so that the probe in a travel thereof and while the probe is being rotated, can snag and effect carcass membrane, crop, trachea and esophagus inedibles pull away removal from the neck passage and carcass cavity environs proximal said neck passage, the probe comprising a probe body, said probe body being elongated and flexibly structured so that said probe body can along at least an appreciable fore length part thereof will when in its travel it contactingly engages a carcass obstruction encroaching such travel deflect from said travel enough to prevent the probe from damaging and/or puncturing the carcass, and fingers carried on and extending outwardly from the probe body, said fingers being sufficiently flexible to bend on engagement with carcass bone structure from a normally unbent condition thereof to a deflected condition thereby to inhibit possibility of breaking of such bone structure with said fingers; said fingers having a length and configuration to be effective when contacting said inedibles to snag and effect pull away removal of said inedibles from said carcass.

2. The probe of claim 1 in which the probe body and the fingers are an integral structure.

3. The probe of claim 2 in which the probe body and the fingers are of a resilient material.

4. The probe of claim 3 in which the resilient material is a polymer based composition.

5. The probe of claim 4 in which the polymer composition is a polyurethane.

6. The probe of claim 5 in which the polyurethane is one having a Shore hardness of about 70 to about 80 durometer on the A scale.

7. The probe of claim 3 in which the probe body carries a rigid fitting at a rear end thereof for connecting said probe body to a stroking member of the decropping apparatus.

8. The probe of claim 3 in which the probe body is a molded mass and the rigid fitting is embedded in said mass.

9. The probe of claim 2 in which the probe body is of substantially cylindrical configuration.

10. The probe of claim 9 in which the fingers extend radially of the probe body.

11. The probe of claim 10 in which the fingers extend obliquely inclined to an outer surface of the probe body.

12. The probe of claim 1 in which the fingers are arrayed on the probe body in longitudinal rows of fingers, the fingers in each row being aligned one with others of said fingers.

13. The probe of claim 12 in which the fingers in each row are spaced substantially uniformly each one from any adjacent finger.

14. The probe of claim 13 in which respective ones of rows of fingers are arrayed circularly spaced on the probe body.

15. The probe of claim 12 in which the rows of fingers are uniformly circularly spaced on the probe body.

16. In apparatus for removing membrane, crop, trachea and esophagus inedibles from a body cavity and neck passage of a poultry carcass while the poultry carcass is hung by its legs from a moving conveyor so that a vent opening to the body cavity faces upwardly and the carcass neck extends downwardly from the body cavity which apparatus includes a removal unit movable in tandem with the conveyor, the removal unit having a probe, stroking means connected with the probe and operable to stroke the probe up and down along a fixed course, said stroking means being further operable to rotate said probe, the probe being operable during the course of being stroked down along said fixed course and while rotating to enter the body cavity and pass adjacent and snag the membranes, crop, trachea and esophagus and pull away remove them from the carcass, the probe in a terminal portion of its downward movement passing through the neck passage while carrying along the removed inedibles to a carcass cleared position so that in said position, the inedibles can be cleaned from the probe, the probe comprising an elongated probe body carrying a plurality of flexible fingers extending outwardly of a probe body outer surface, the probe body being flexibly structured so that at least a fore length part thereof will when contactingly engaging a carcass obstruction encroaching the probe fixed course deflect from the fixed course enough to prevent the probe body damaging and/or puncturing the carcass, said flexible fingers bending flexibly upon engagement of said fingers with carcass bone structure from a normally unbent condition thereof to a deflected condition thereby to inhibit possibility of breaking of such bone structure with said fingers, said fingers having a length and configuration to be effective when contacting said inedibles to snag and effect pull away removal of said inedibles from the carcass.

17. The apparatus of claim 16 in which the probe body and flexible fingers are integral and of a resilient material.

18. The apparatus of claim 17 in which the resilient material is one having a Shore hardness of about 70 to 80 durometer on the A scale.

19. The apparatus of claim 18 in which the resilient material is a urethane polymer.

20. The apparatus of claim 17 in which the resilient fingers have planar front and rear faces.

21. The apparatus of claim 20 in which the resilient fingers have planar opposite side faces.

22. The apparatus of claim 21 in which the resilient fingers have a planar flat top face.

23. The apparatus of claim 21 in which the resilient fingers have a convexly rounded top face.

* * * * *